(12) United States Patent
Beecroft et al.

(10) Patent No.: US 8,996,277 B2
(45) Date of Patent: Mar. 31, 2015

(54) GAS TURBINE ENGINE CONTROL

(71) Applicant: Rolls-Royce PLC, London (GB)

(72) Inventors: Peter Beecroft, Wakefield (GB); Leo Vivian Lewis, Kenilworth (GB); Marko Bacic, Oxford (GB)

(73) Assignee: Rolls-Royce PLC, London (GB)

( * ) Notice: Subject to any disclaimer, the term of this patent is extended or adjusted under 35 U.S.C. 154(b) by 0 days.

(21) Appl. No.: 13/735,508

(22) Filed: Jan. 7, 2013

(65) Prior Publication Data

US 2013/0191004 A1 Jul. 25, 2013

(30) Foreign Application Priority Data

Jan. 24, 2012 (GB) .................................. 1201094.8

(51) Int. Cl.
| | |
|---|---|
| *G06F 19/00* | (2011.01) |
| *F04D 27/02* | (2006.01) |
| *G05B 13/02* | (2006.01) |
| *F01D 11/20* | (2006.01) |
| *F02C 9/00* | (2006.01) |
| *F02C 9/28* | (2006.01) |

(52) U.S. Cl.
CPC . *F02C 9/00* (2013.01); *F01D 11/20* (2013.01); *F02C 9/28* (2013.01); *F05D 2260/80* (2013.01)
USPC ................................. 701/100; 415/1; 700/39

(58) Field of Classification Search
USPC ................................. 701/100; 415/1; 700/39
See application file for complete search history.

(56) References Cited

U.S. PATENT DOCUMENTS

| | | | | |
|---|---|---|---|---|
| 4,856,272 | A * | 8/1989 | Putman et al. ................... | 60/782 |
| 5,197,280 | A * | 3/1993 | Carpenter et al. .............. | 60/204 |
| 6,449,565 | B1 | 9/2002 | Budrow et al. | |
| 6,463,380 | B1 * | 10/2002 | Ablett et al. ................... | 701/100 |
| 7,431,557 | B2 * | 10/2008 | Herron et al. ...................... | 415/1 |
| 7,891,938 | B2 * | 2/2011 | Herron et al. ...................... | 415/1 |
| 2003/0125906 | A1 * | 7/2003 | Guaglardi ..................... | 702/182 |
| 2006/0116847 | A1 | 6/2006 | Plotts et al. | |
| 2007/0276578 | A1 * | 11/2007 | Herron et al. ................. | 701/100 |
| 2009/0143871 | A1 * | 6/2009 | Gao et al. ......................... | 700/29 |
| 2012/0023894 | A1 | 2/2012 | Martin | |
| 2013/0191004 | A1 * | 7/2013 | Beecroft et al. .............. | 701/100 |

FOREIGN PATENT DOCUMENTS

| | | |
|---|---|---|
| EP | 2 211 139 A1 | 7/2010 |
| EP | 2 388 666 A2 | 11/2011 |
| GB | 2 351 361 A | 12/2000 |
| GB | 2 428 844 A | 2/2007 |

OTHER PUBLICATIONS

British Search Report issued in Application No. 1201094.8; Dated May 24, 2012.

* cited by examiner

*Primary Examiner* — Thomas Black
*Assistant Examiner* — Tyler Paige
(74) *Attorney, Agent, or Firm* — Oliff PLC

(57) ABSTRACT

A gas turbine engine control apparatus comprises a controller 34, a memory 36 associated with the controller 34 and inputs 38 for measurement data from an engine. The controller 34 determines the start of a monitoring cycle at 73, receives measurement data at the inputs 38 during the monitoring cycle, manipulates the measurement data to provide an incremental deterioration value representing deterioration occurring within the engine and during the monitoring cycle, and uses the incremental deterioration value at 72 to update a deterioration value 74 stored in the memory 36, and determines the start of a further monitoring cycle.

16 Claims, 3 Drawing Sheets

GAS TURBINE ENGINE CONTROL

The present invention relates to improvements in or relating to control apparatus for gas turbine engines.

The efficiency of a gas turbine engine may reduce with use, for various reasons. For example, deterioration can arise in relation to rotating blades within the engine, particularly turbine blades. The turbines in a gas turbine engine are typically made up of four main components, namely a rotating disc, turbine blades mounted on the disc, a casing surrounding the blades, and seal segments between the blades and the casing. Turbine performance can be improved by minimising the clearance between the tips of the rotating turbine blades and the static seal segments. As the gas turbine is used, the turbines can deteriorate in such a way that the clearances increase. This causes the efficiency of individual turbine blades to decrease and thus adversely affects the overall efficiency of the gas turbine engine. Tip clearance control systems have therefore been proposed.

Examples of the present invention provide a gas turbine engine control apparatus comprising:
 a controller;
 a memory associated with the controller;
 and at least one input for measurement data from an engine;
wherein the controller is operable to:
 determine the start of a monitoring cycle;
 receive measurement data at the or each input during the monitoring cycle;
 manipulate the measurement data to provide an incremental deterioration value representing deterioration occurring within the engine and during the monitoring cycle;
 use the incremental deterioration value to update a deterioration value stored in the memory; and
 determine the start of a further monitoring cycle.

This provides the advantage that actual deterioration can be assessed, according to the measurements taken from the engine, and the accumulated deterioration is recorded to allow compensation for deterioration to be provided on the basis of the actual history of the engine.

The deterioration value may represent deterioration relating to tip clearance of a rotating blade. The rotating blade may be a turbine blade.

The controller may be further operable to retrieve from memory the deterioration value in the memory at the start of the monitoring cycle, and to provide the retrieved deterioration value to a further control system for use during the monitoring cycle for providing compensation for the deterioration represented by the retrieved deterioration value.

The controller may receive measurement data relating to a plurality of parameters. The controller may manipulate data relating to each of a plurality of factors relating to deterioration, to provide a factor value relating to each factor, the factor values being combined to provide the incremental deterioration value.

The factors may relate to tip clearance of a rotating blade and include at least one of the following factors:
 oxidation of a seal segment relative to which the blade rotates;
 blade creep of the rotating blade; and
 rubbing of a seal segment by the tip of the blade.

The result of data manipulation by the controller may be constrained by upper and/or lower limit values to prevent spurious results which are beyond the or a limit. The or at least one of the limits may be dependent on the number of monitoring cycles which have been executed.

Examples of the present invention also provide a method of controlling a gas turbine engine, in which:
 the start of a monitoring cycle is determined;
 measurement data is received from the engine during the monitoring cycle;
 the measurement data is manipulated to provide an incremental deterioration value representing deterioration occurring within the engine and during the monitoring cycle;
 the incremental deterioration value is used to update a deterioration value which is stored; and
 the start of a further monitoring cycle is determined.

The deterioration value may represent deterioration relating to tip clearance of a rotating blade. The rotating blade may be a turbine blade.

The method may include retrieving the deterioration value at the start of the monitoring cycle, and providing the retrieved deterioration value for use during the monitoring cycle for providing compensation for the deterioration represented by the retrieved deterioration value.

The measurement data may relate to a plurality of parameters. Data may be manipulated relating to each of a plurality of factors relating to deterioration, to provide a factor value relating to each factor, the factor values being combined to provide the incremental deterioration value.

The factors may relate to tip clearance of a rotating blade and include at least one of the following factors:
 oxidation of a seal segment relative to which the blade rotates;
 blade creep of the rotating blade; and
 rubbing of a seal segment by the tip of the blade.

The result of data manipulation may be constrained by upper and/or lower limit values to prevent spurious results which are beyond the or a limit. The or at least one of the limits may be dependent on the number of monitoring cycles which have been executed.

Examples of the present invention will now be described in more detail, by way of example only, and with reference to the accompanying drawings, in which.

Figure 1:
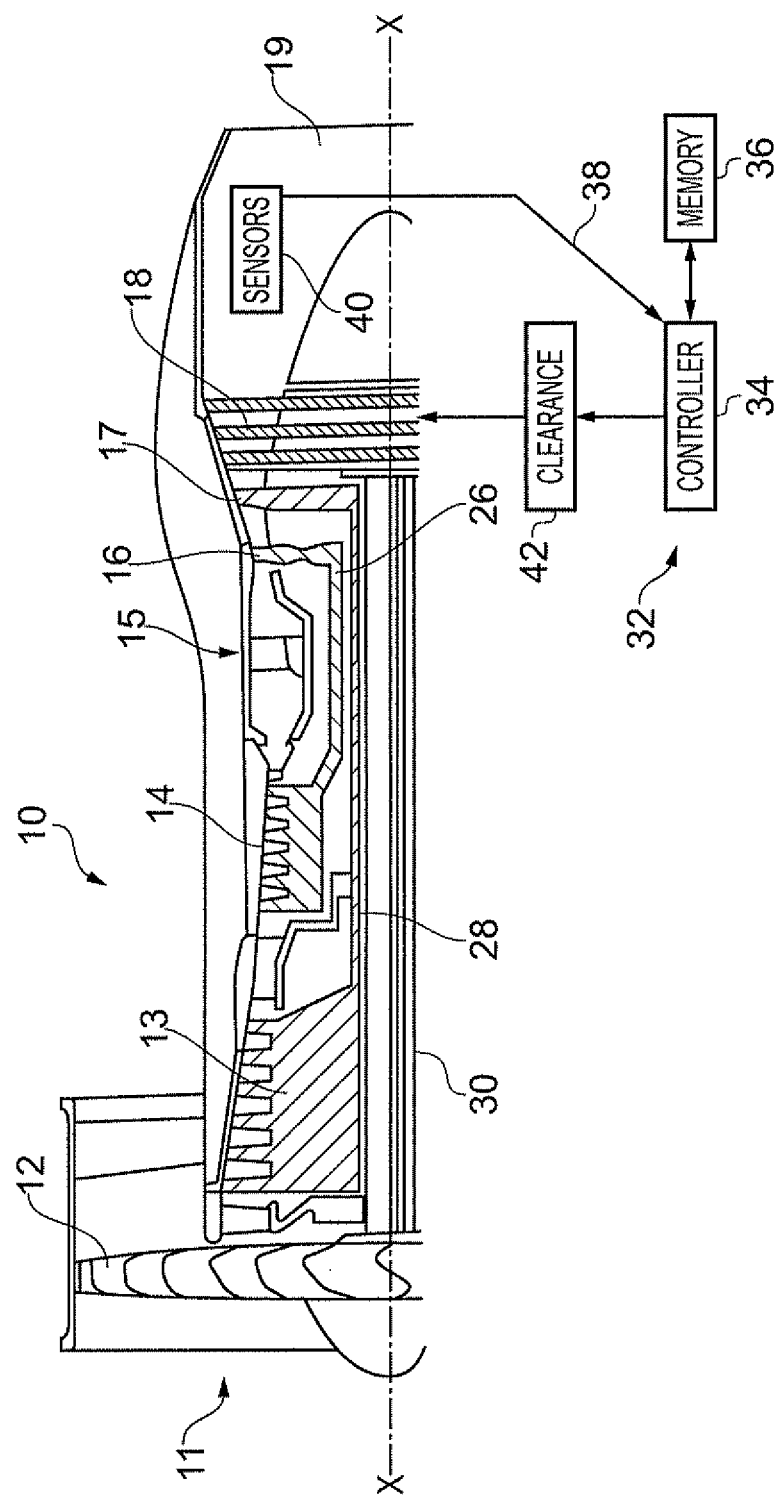
FIG. 1 is a schematic section along the axis of a gas turbine engine of the type to which this invention relates.

Referring to FIG. 1, a gas turbine engine is generally indicated at 10 and comprises, in axial flow series, an air intake 11, a propulsive fan 12, an intermediate pressure compressor 13, a high pressure compressor 14, a combustor 15, a turbine arrangement comprising a high pressure turbine 16, an intermediate pressure turbine 17 and a low pressure turbine 18, and an exhaust nozzle 19.

The gas turbine engine 10 operates so that air entering the intake 11 is accelerated by the fan 12 which produces two air flows: a first air flow into the intermediate pressure compressor 13 and a second air flow which provides propulsive thrust. The intermediate pressure compressor compresses the air flow directed into it before delivering that air to the high pressure compressor 14 where further compression takes place.

The compressed air exhausted from the high pressure compressor 14 is directed into the combustor 15 where it is mixed with fuel and the mixture combusted. The resultant hot combustion products then expand through, and thereby drive, the high, intermediate and low pressure turbines 16, 17 and 18 before being exhausted through the nozzle 19 to provide additional propulsive thrust. The high, intermediate and low pressure turbines 16, 17 and 18 respectively drive the high and intermediate pressure compressors 14 and 13 and the fan 12 by suitable interconnecting shafts 26, 28, 30.

The gas turbine engine 10 has control apparatus 32 associated with it, comprising a controller 34, a memory 36 associated with the controller 34 and at least one input 38 for measurement data derived from the engine 10 by one or more sensors 40.

The sensors 40 are schematically illustrated in the exhaust region of the engine 10, but sensors 40 could be at any appropriate positions through the engine 10.

A clearance control system 42 is also provided for controlling the clearance achieved by the turbine blades of one or more of the turbines 16, 17, 18. Control of blade clearances may be achieved, for example, by variation of the amount of cooling air directed to static components of the turbine.

Figure 2:
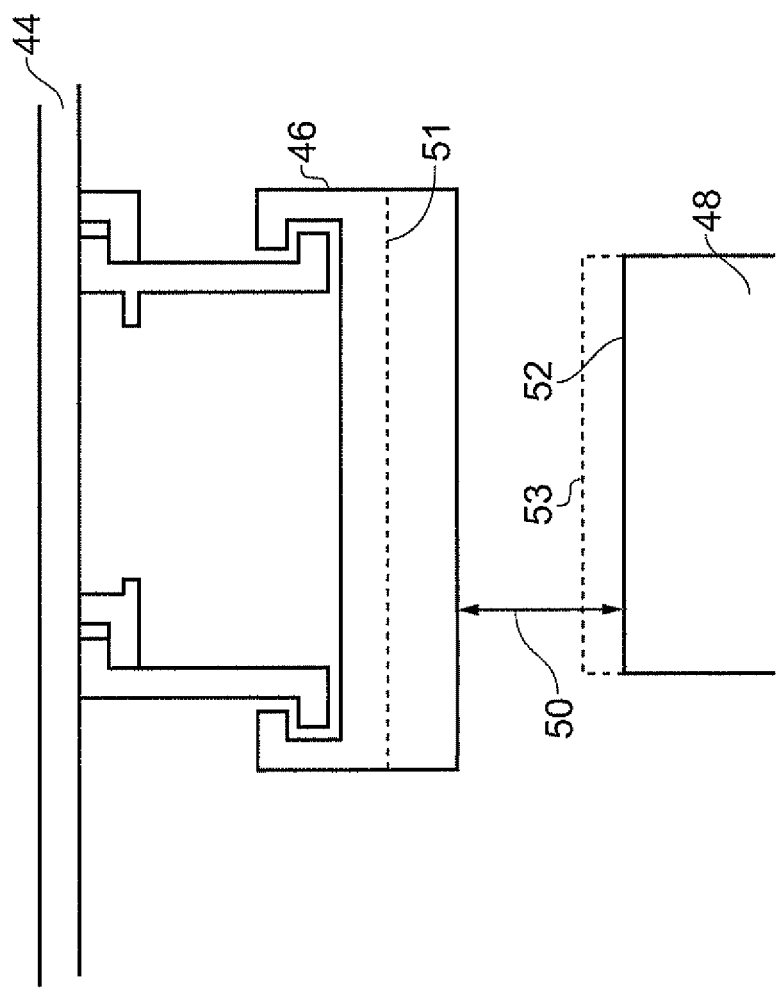
FIG. 2 is a highly enlarged part of FIG. 1, showing a turbine blade tip and associated components.

FIG. 2 illustrates in more detail the features associated with tip clearance. The casing 44 of the engine 10 carries a ring of seal segments 46, one of which is visible in FIG. 2. The seal segments 46 surround the blades 48 of the turbine, one of which is visible in FIG. 2. A clearance 50 exists between the seal segment 46 and the tip 52 of the blade 48. Maintaining the correct clearance 50 is important in ensuring efficient operation of the blade 48. However, ageing of the turbines is found to create deterioration in the clearance 50, for various reasons. First, the lining material of the seal segments 46 may suffer oxidation, over long periods of time, due to the seal segment surface being exposed to high temperature combustion gases during use. This results in material loss from the seal segment, resulting in the clearance 50 opening up as the engine ages. A broken line at 51 indicates a possible future extremity of the seal segment 46, after the lining material has suffered oxidation, causing the seal segment surface to retreat. Secondly, the seal segment 46 has an abradable lining against which blade tips 52 may rub during extreme engine manoeuvres, particularly as a result of thermal and/or mechanical growth of the blades 48. When an incursion of a blade tip 52 into a seal segment 46 occurs, instantaneous material loss from the seal segment 46 and/or the blade tip 52 will typically occur, resulting in a sudden increase in the clearance 50. Again, this will cause the seal segment surface to retreat, at least locally. Thirdly, extension of the length of the turbine blade 48, known as "creep", can occur as the blade 48 ages. It is found that creep will typically occur over long periods of time, and results in the clearance 50 reducing. A broken line 53 indicates a possible future position of the tip 52, after blade creep has occurred.

In the examples being described, tip clearance around the blades of a turbine is considered. In other examples, the principles can be applied to tip clearance around other rotating blades, such as compressor blades.

Control of the tip clearance 50 is provided in these examples by the controller 34 instructing the clearance control system 42 to make appropriate adjustments. The manner in which the clearance control system achieves control of the tip clearance does not itself form part of this invention and will not be described further.

Figure 3:
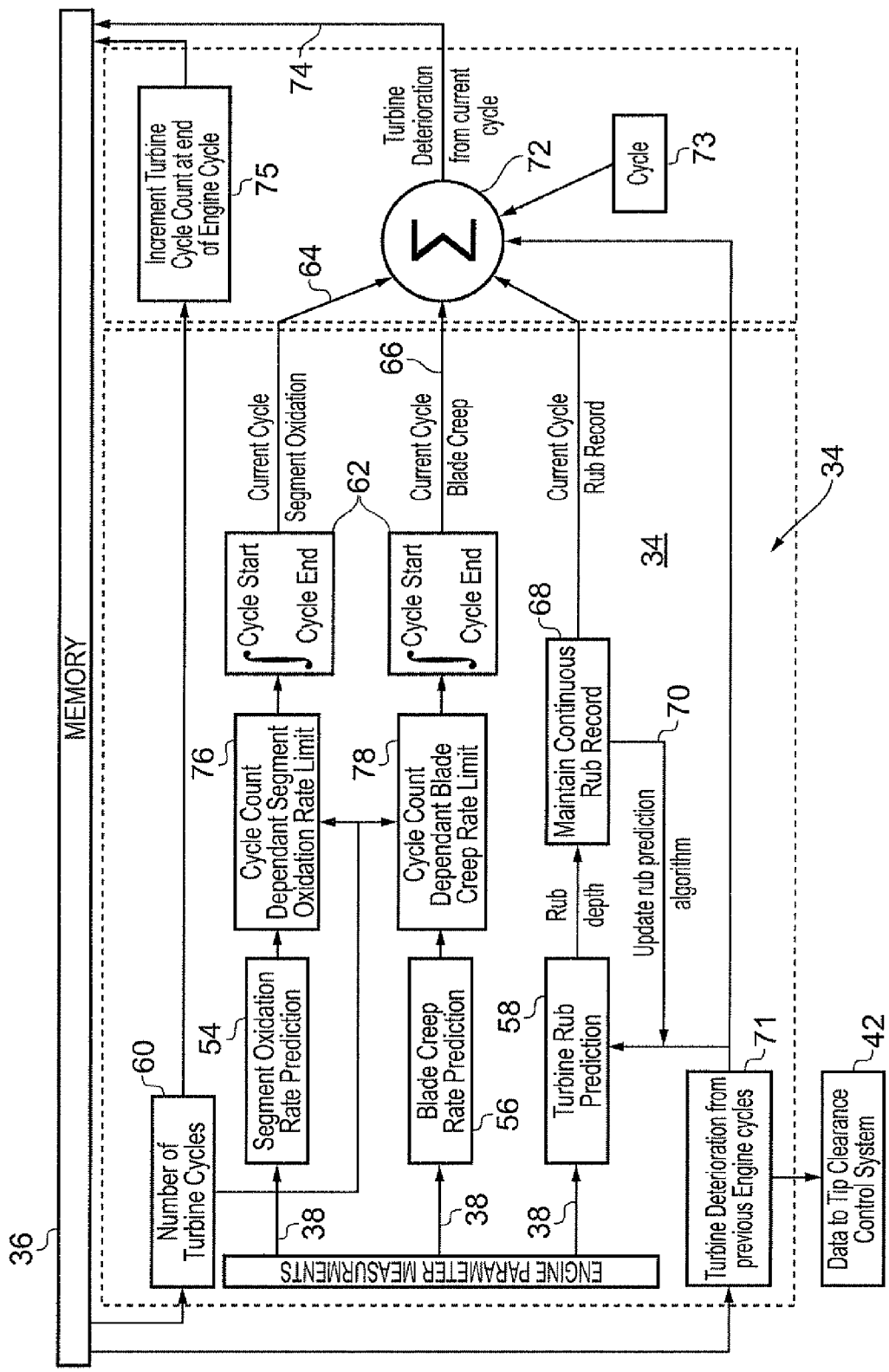
FIG. 3 is a schematic diagram of a controller for the engine of FIG. 1.

The structure of the controller 34 is illustrated in more detail in FIG. 3, which illustrates various functional blocks within the controller 34. Each of these functional blocks may be implemented by dedicated hardware or by programmable hardware operating under the control of appropriate software or firmware.

As noted above, the controller 34 includes inputs 38 for receiving measurement data from the engine 10. Examples of measurement data include temperatures, pressures, shaft speeds and tip clearance. The controller manipulates data relating to each of a plurality of factors relating to deterioration. For example, in this example, measurement data is used at 54 for prediction of the oxidation rate of the seal segments 46, using an appropriate oxidation rate prediction algorithm. Measurement data is also used at 56 for prediction of the rate at which blades 48 will creep, using an appropriate blade creep rate prediction algorithm. Measurement data is also used at 58 for prediction of the number and magnitude of any incursions of blade tips 52 into the seal segments 46, using an appropriate turbine rub prediction algorithm. The outputs of the algorithms 54, 56, 58 represent factor values relating to the corresponding deterioration factor.

The controller 34 also receives two other items of data, from the memory 36. The first represents the total number of turbine cycles for which the engine 10 has run, received at 60. This allows the controller 34 to determine the start of a monitoring cycle, which may be the whole of an engine cycle, or part of an engine cycle. That is, there may be multiple monitoring cycles within a single engine cycle, or a monitoring cycle may be coterminous with an engine cycle. The second data item received from the memory 36 by the controller 34 is a value representing deterioration in the turbine, which has occurred during previous monitoring cycles.

During the operation of the gas turbine engine 10, the rate of segment oxidation and blade creep are continuously calculated by the respective algorithms at 54, 56. These algorithms may use mathematical models based on a number of measured engine parameters, including temperatures, pressures, shaft speeds and tip clearance estimates. Measurements for use in calculations according to these algorithms are received through the inputs 38. The calculated oxidation rates and creep rates are continuously integrated at 62 during the monitoring cycle, resulting in values output at 64, 66, respectively representing the amount of segment oxidation and blade creep which has occurred during the monitoring cycle. Thus, the values 64, 66 relate to a respective deterioration factor.

Alongside these calculations, the illustrated example uses the turbine rub prediction algorithm at 58 to predict tip clearance from measured engine parameters received through the input 38, or from sensors which directly measure tip clearance. The turbine rub prediction algorithm 58 also makes use of a value representing turbine deterioration from previous cycles, received from the memory 36 and stored at 71. The calculation performed by the algorithm 58 allows a prediction to be made of the number and magnitude of any incursions of tips 52 into the seal segments, during the monitoring cycle. A record of these incursions is maintained at 68 and this value is made available at 70 for use by the turbine rub algorithm 58.

Periodically, the controller 34 determines at 73 that a monitoring cycle is to close, and a further monitoring cycle is to begin. This determination may occur at the end of an engine cycle, or each time a turbine tip rub is predicted by the algorithm 58, or after the engine has been running for a predetermined time. At the end of the monitoring cycle, a combination function 72 is triggered by the closing of the monitoring cycle and combines the record of any rubs occurring during the monitoring cycle, held at 68, with the segment oxidation and blade creep values at 64, 66, to compute the amount of turbine deterioration (in terms of the change in tip clearance) which has occurred during the monitoring cycle which is closing. Thus, the combination function 72 combines the various factor values provided by the algorithms 54, 56, 58. Thus, the combination function 72 provides an incremental deterioration value representing deterioration occurring during the monitoring cycle. The incremental deterioration value is used in conjunction with the deterioration value from previous cycles, held at 71, to provide an updated deterioration value representing the accumulated deterioration, which is output at 74. The updated deterioration value 74 is used to update the deterioration value stored in the memory 36. The controller 34 will then determine that a further monitoring cycle has begun, and will commence operation again, in the manner described above.

The number of turbine cycles held at 60 is also incremented, as appropriate, at 75, at the end of a monitoring cycle, in order to update the number held in the memory 36.

During a monitoring cycle, the current deterioration value arising from previous cycles is made available from the store 71 to the clearance control system 42, allowing the clearance control system 42 to take appropriate action to control the blades.

Limit functions 76, 78 are interposed respectively between the oxidation algorithm 54 and the combination function 72, and between the blade creep algorithm 56 and the combination function 72. The limit functions 66, 68 set upper and lower limits on the outputs of the algorithms 54, 56. These limits ensure that spuriously large or small predictions for oxidation or creep are ignored. Furthermore, if desired, the upper and lower limits may be set to the same value, with the limit functions 76, 78 being also provided with the elapsed number of turbine cycles from 60, so that the prediction values provided to the integrators 62 can be set to depend solely on the elapsed number of turbine cycles, resulting in a simple count-based mode of operation in which the deterioration assumed from each of these factors is directly dependent upon the number of turbine cycles which have occurred.

New monitoring cycles will begin at defined points in the engine cycle. One of the defined points will usually be start-up. When a monitoring cycle begins, the latest data regarding deterioration of the turbines is loaded from memory, as noted above. This process may be subject to validation using cyclic redundancy checking, range checking, cross checking or other data validation techniques. Once the deterioration value has been retrieved and validated, it is used to control the tip clearance control system 42 during the forthcoming monitoring cycle and is also available to the algorithms 54, 56, 58 and the combination function 72. At the end of the monitoring cycle, the deterioration value is modified by the incremental deterioration value, and the modified deterioration value is stored for use in the next monitoring cycle. The main purpose of maintaining and updating the deterioration value is to maintain high turbine efficiencies through the operation of the tip clearance control system 42. However, the deterioration value is also expected to be valuable as an aid for planning maintenance action for the turbines.

The description set out above has related to turbine blades. The system which has been described could also be used to compensate for deterioration which can occur in the compressors of a gas turbine, if a suitable tip clearance control system is available for the compressor blades. It is also envisaged that the system could be used to compensate for deterioration in these or other components, or to maintain a record of the deterioration, periodically updated at the end of each monitoring cycle, to aid in the planning of maintenance action.

Although embodiments of the present invention have been described in the preceding paragraphs with reference to various examples, it should be appreciated that modifications to the examples given can be made without departing from the scope of the invention as claimed. Features and functions described in the preceding description may be used in combinations other than the combinations explicitly described.

Whilst endeavouring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

The invention claimed is:

1. A gas turbine engine control apparatus comprising:
a controller;
a memory associated with the controller;
and at least one input for measurement data from an engine;
wherein the controller is operable to:
  determine the start of a monitoring cycle;
  receive measurement data at the or each input during the monitoring cycle;
  manipulate the measurement data to provide an incremental deterioration value representing deterioration occurring within the engine and during the monitoring cycle;
  use the incremental deterioration value to update a deterioration value stored in the memory;
  determine the start of a further monitoring cycle;
  retrieve from the memory the deterioration value in the memory at the start of the monitoring cycle; and
  provide the retrieved deterioration value to a further control system for use during the monitoring cycle for providing compensation for the deterioration represented by the retrieved deterioration value.

2. Apparatus according to claim 1, wherein the deterioration value represents deterioration relating to tip clearance of a rotating blade.

3. Apparatus according to claim 2, wherein the rotating blade is a turbine blade.

4. Apparatus according to claim 1, wherein the controller receives measurement data relating to a plurality of parameters.

5. Apparatus according to claim 1, wherein the controller is operable to manipulate data relating to each of a plurality of factors relating to deterioration, to provide a factor value relating to each factor, the factor values being combined to provide the incremental deterioration value.

6. Apparatus according to claim 5, wherein the factors relate to tip clearance of a rotating blade and include at least one of the following factors:
oxidation of a seal segment relative to which the blade rotates;
blade creep of the rotating blade; and
rubbing of a seal segment by the tip of the blade.

7. Apparatus according to claim 5, wherein the result of data manipulation by the controller is constrained by upper and/or lower limit values to prevent spurious results which are beyond the or a limit.

8. Apparatus according to claim 7, wherein the or at least one of the limits is dependent on the number of monitoring cycles which have been executed.

9. A method of controlling a gas turbine engine, comprising:
determining the start of a monitoring cycle;
receiving measurement data from the engine during the monitoring cycle;
manipulating the measurement data to provide an incremental deterioration value representing deterioration occurring within the engine and during the monitoring cycle;
using the incremental deterioration value to update a deterioration value which is stored;
determining the start of a further monitoring cycle;

retrieving the deterioration value at the start of the monitoring cycle; and providing the retrieved deterioration value for use during the monitoring cycle for providing compensation for the deterioration represented by the retrieved deterioration value.

10. A method according to claim 9, wherein
the deterioration value represents deterioration relating to tip clearance of a rotating blade.

11. A method according to claim 10, wherein
the rotating blade is a turbine blade.

12. A method according to claim 9, wherein
the measurement data relates to a plurality of parameters.

13. A method according to claim 9, wherein
data is manipulated relating to each of a plurality of factors relating to deterioration, to provide a factor value relating to each factor, the factor values being combined to provide the incremental deterioration value.

14. A method according to claim 13, wherein
the factors relate to tip clearance of a rotating blade and include at least one of the following factors:

oxidation of a seal segment relative to which the blade rotates;

blade creep of the rotating blade; and rubbing of a seal segment by the tip of the blade.

15. A method according to claim 13, wherein
the result of data manipulation is constrained by upper and/or lower limit values to prevent spurious results which are beyond the or a limit.

16. A method according to claim 15, wherein
the or at least one of the limits are dependent on the number of monitoring cycles which have been executed.

* * * * *